(12) United States Patent
Taylor et al.

(10) Patent No.: US 12,078,102 B2
(45) Date of Patent: Sep. 3, 2024

(54) AIR RECUPERATED ENGINE WITH AIR REINJECTION

(71) Applicant: RAYTHEON TECHNOLOGIES CORPORATION, Farmington, CT (US)

(72) Inventors: Stephen H. Taylor, East Hartford, CT (US); Alan Retersdorf, Avon, CT (US); Oliver V. Atassi, Longmeadow, MA (US); Nathan A. Snape, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/951,972

(22) Filed: Sep. 23, 2022

(65) Prior Publication Data
US 2024/0102417 A1    Mar. 28, 2024

(51) Int. Cl.
| | |
|---|---|
| *F02C 6/08* | (2006.01) |
| *F02C 3/13* | (2006.01) |
| *F02C 7/08* | (2006.01) |
| *F02C 7/10* | (2006.01) |
| *F02C 7/32* | (2006.01) |
| *F02C 9/18* | (2006.01) |
| *F02C 9/52* | (2006.01) |
| *F02G 5/00* | (2006.01) |
| *F02K 3/02* | (2006.01) |

(52) U.S. Cl.
CPC ............... *F02C 6/08* (2013.01); *F02C 3/13* (2013.01); *F02C 7/08* (2013.01); *F02C 7/10* (2013.01); *F02C 7/32* (2013.01); *F02C 9/18* (2013.01); *F02C 9/52* (2013.01); *F02G 5/00* (2013.01); *F02K 3/02* (2013.01)

(58) Field of Classification Search
CPC ...... F02C 6/08; F02C 6/10; F02C 6/18; F02C 9/01; F02C 9/18; F02C 9/52; F02C 7/08; F02C 7/10; F02C 7/12; F02C 7/16; F02C 7/18; F02C 7/32; F02C 3/13; F02K 3/02; F02K 3/10
See application file for complete search history.

(56) References Cited

U.S. PATENT DOCUMENTS

| | | | |
|---|---|---|---|
| 3,418,808 A | 12/1968 | Rich | |
| 3,765,170 A | 10/1973 | Nakamura | |
| 4,136,516 A * | 1/1979 | Corsmeier | .............. F01D 25/12 |
| | | | 415/116 |

(Continued)

FOREIGN PATENT DOCUMENTS

| | | |
|---|---|---|
| EP | 3133249 A1 | 2/2017 |
| GB | 1018050 A | 1/1966 |

OTHER PUBLICATIONS

European Search Report for European Application No. 23199550.7 mailed Feb. 29, 2024.

*Primary Examiner* — Kyle Robert Thomas
(74) *Attorney, Agent, or Firm* — Carlson, Gaskey & Olds, P.C.

(57) ABSTRACT

A gas turbine engine assembly including a tap that is at a location up stream of the combustor section for drawing a bleed airflow. An exhaust heat exchanger is configured to transfer thermal energy from the exhaust gas flow into the bleed airflow and communicate the heated bleed airflow into the turbine section where it is expanded to drive the turbine section.

13 Claims, 5 Drawing Sheets

(56) References Cited

U.S. PATENT DOCUMENTS

| | | | | |
|---|---|---|---|---|
| 4,376,375 A | * | 3/1983 | Boudigues | F02K 3/075 60/226.3 |
| 4,858,428 A | * | 8/1989 | Paul | F02C 9/18 60/39.17 |
| 6,250,061 B1 | * | 6/2001 | Orlando | F02C 7/18 60/772 |
| 9,169,782 B2 | * | 10/2015 | Subramaniyan | F01D 9/065 |
| 11,041,444 B2 | * | 6/2021 | Redford | F02C 6/08 |
| 11,391,211 B2 | | 7/2022 | Smith et al. | |
| 2020/0165974 A1 | * | 5/2020 | Smith | F02C 7/18 |

* cited by examiner

AIR RECUPERATED ENGINE WITH AIR REINJECTION

TECHNICAL FIELD

The present disclosure relates generally to a turbine engine including a waste heat recovery system for capturing thermal energy to perform useful work.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine.

Turbine engine manufacturers continue to seek further improvements to engine performance including improvements to reduce environmental impact while improving thermal and propulsive efficiencies.

SUMMARY

A gas turbine engine assembly according to an exemplary embodiment of this disclosure, among other possible things includes a core engine that includes a core flow path where a core airflow is compressed in a compressor section, communicated to a combustor section, mixed with fuel and ignited to generate an exhaust gas flow that is expanded through a turbine section, the turbine section is coupled to drive the compressor section through an engine drive shaft. The gas turbine engine further includes a tap that is at a location up stream of the combustor section for drawing a bleed airflow, an exhaust heat exchanger that is configured to transfer thermal energy from the exhaust gas flow into the bleed airflow, and an injection location that is in communication with a portion of the turbine section for communicating a heated bleed airflow that is exhausted from the exhaust heat exchanger into the turbine section. The heated bleed airflow is expanded to drive the turbine section.

In a further embodiment of the foregoing, the turbine section includes a high pressure turbine section and a low pressure turbine section and the injection location is within the low pressure turbine section.

In a further embodiment of any of the foregoing, the low pressure turbine section includes a first low pressure turbine and a second low pressure turbine and the injection location is disposed between aft of the first low pressure turbine.

In a further embodiment of any of the foregoing, the gas turbine engine includes a secondary heat source that heats the bleed air that is exhausted from the exhaust heat exchanger before injection at the injection location.

In a further embodiment of any of the foregoing, the bleed airflow that is exhausted from the secondary heat source and the exhaust gas flow that is exhausted from the first low pressure turbine are of equal pressure and equal temperature.

In a further embodiment of any of the foregoing, the secondary heat source is a low-temperature burner.

In a further embodiment of any of the foregoing, the gas turbine engine includes a secondary heat transfer loop with a heat transfer medium that accepts thermal energy from the exhaust gas flow and communicates the accepted thermal energy into the bleed airflow prior to the bleed airflow being communicated to the injection location.

In a further embodiment of any of the foregoing, the turbine section includes at least one turbine rotor that includes inner rotor blades where the exhaust gas flow is expanded and outer rotor blades where the heated bleed airflow is expanded.

In a further embodiment of any of the foregoing, the inner rotor blades and the exhaust gas flow are isolated from the outer rotor blades and the heated bleed airflow by a shroud hub.

In a further embodiment of any of the foregoing, the at least one turbine rotor is a portion of a second turbine section.

In a further embodiment of any of the foregoing, the compressor section includes a low-pressure compressor that is disposed upstream of the combustor section and the tap is located downstream of the low-pressure compressor and upstream of the combustor section.

A waste heat recovery system for a gas turbine engine according to another exemplary embodiment of this disclosure, among other possible things includes a first tap that draws bleed airflow from a core flow path up stream of a combustor section of the gas turbine engine, an exhaust heat exchanger that is configured to transfer thermal energy from the exhaust gas flow into the bleed airflow, and an injection location within the turbine section where heated bleed airflow is received and expanded through the turbine section to generate a mechanical power output.

In a further embodiment of the foregoing, the turbine section includes a high pressure turbine section and a low pressure turbine section and the injection location is within the low pressure turbine section.

In a further embodiment of any of the foregoing, the low pressure turbine section includes a first low pressure turbine and a second low pressure turbine and the injection location is disposed aft of the first low pressure turbine.

In a further embodiment of any of the foregoing, the waste heat recovery system includes a secondary heat source that heats the bleed air that is exhausted from the exhaust heat exchanger before injection at the injection location.

In a further embodiment of any of the foregoing, the waste heat recovery system includes a secondary heat transfer loop with a heat transfer medium that accepts thermal energy from the exhaust gas flow and communicates the accepted thermal energy into the bleed airflow prior to the bleed airflow being communicated to the injection location.

In a further embodiment of any of the foregoing, the turbine section includes at least one turbine rotor that includes inner rotor blades where the exhaust gas flow is expanded and outer rotor blades where the heated bleed airflow is expanded.

A method of operating a gas turbine engine assembly according to another exemplary embodiment of this disclosure, among other possible things includes generating an exhaust gas flow by igniting a fuel mixed with a core airflow, communicating a portion of the core airflow as a bleed airflow through a tap that is located upstream of a combustor section, heating bleed air flow in an exhaust heat exchanger that is in thermal communication with the combusted gas flow, injecting the heated bleed airflow through an injection location within the turbine section, and generating shaft power by expanding the exhaust gas flow and at least a portion of the heated bleed airflow through the turbine section.

In a further embodiment of the foregoing, the turbine section includes at least one turbine rotor with inner rotor blades through which the exhaust gas flow expands and outer rotor blades through which the heated bleed airflow is expands.

In a further embodiment of any of the foregoing, the method further includes heating bleed airflow that is exhausted from the exhaust heat exchanger with a secondary heat source before injection at the injection location.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
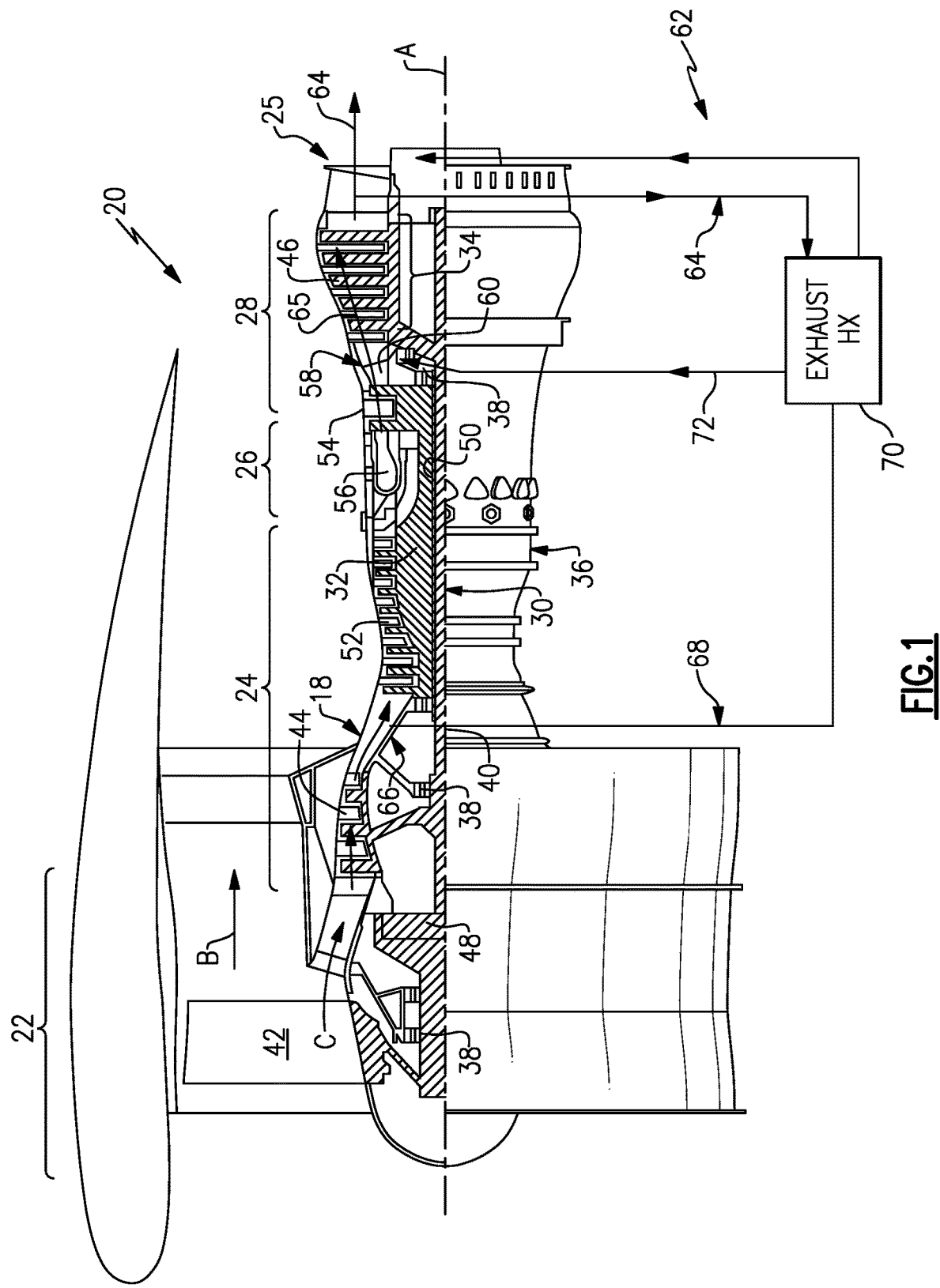
FIG. 1 is a schematic view of an example turbine engine embodiment.

FIG. 1 schematically illustrates an example gas turbine engine 20 with a waste heat recovery system 62 utilizing waste heat from an exhaust gas flow 64 to heat a bleed airflow 68 that is then expanded through a turbine section 28 to supplement power derived from the expansion of a combusted gas flow 65.

The engine 20 includes a fan section 22, a compressor section 24, a combustor section 26 and the turbine section 28. The fan section 22 drives inlet air along a bypass flow path B, while the compressor section 24 draws air in along a core flow path C where a core airflow 18 is compressed and communicated to a combustor section 26. In the combustor section 26, air is mixed with fuel and ignited to generate the high energy combusted gas flow 65 that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines. For example, the concepts described herein may be applied to a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the fan section 22 through a speed change device, such as a geared architecture 48, to drive the fan section 22 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low-pressure turbine 46.

A core airflow 18 through the core airflow path C is compressed by the low-pressure compressor 44 then by the high-pressure compressor 52 mixed with fuel and ignited in the combustor 56 to produce the high energy hot combusted gas flow 65 that is expanded through the high-pressure turbine 54 and low-pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low-pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 disclose an example gas turbine engine 20 with increased power transfer efficiency.

Thermal energy produced through the combustion process is wasted as the exhaust gas flow 64 is vented through a nozzle 25 to atmosphere after expansion through the turbine section 28. The disclosed waste heat recovery system 62 captures a portion of the thermal energy to supplement power generated by the combusted gas flow 65.

The waste heat recovery system 62 recaptures waste heat from the exhaust gas flow 64 exhausted from the turbine section 28 and heats the bleed airflow 68 within an exhaust heat exchanger 70 and communicates the heated bleed airflow 72 to the turbine section 28 where it is expanded to supplemental power.

Figure 2:
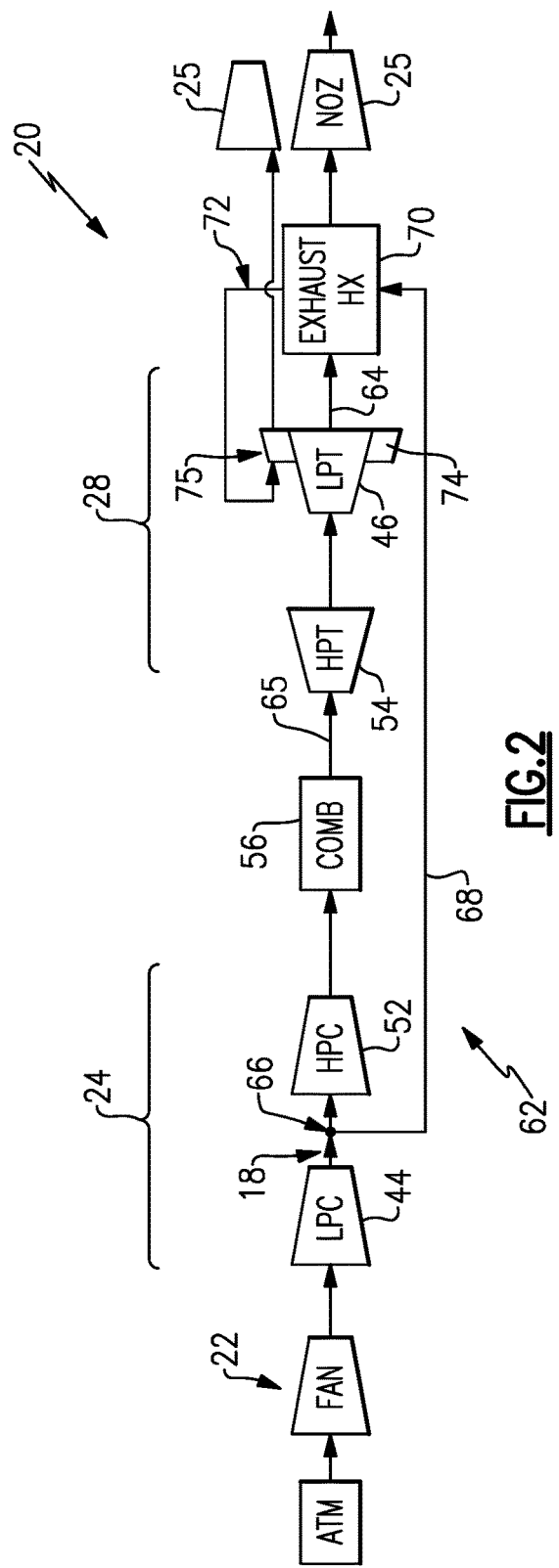
FIG. 2 is a simplified schematic view of the example turbine engine embodiment of FIG. 1.

Referring to FIG. 2 with continued reference to FIG. 1, a simplified schematic view of an example gas turbine engine 20 is shown and includes the waste heat recovery system 62 and a tip turbine rotor 74 as part of the LPT 46. Bleed air 68 is drawn from a tap 66 located in the compressor section 24. In this example embodiment, the tap 66 is disposed downstream of the LPC 44. However, the location of the tap 66 may be in other portions of the compressor section 24. The location of tap 66 may be located immediately following the fan 22, within the LPC 44, within the HPC 52, after the HPC 52 or some combination of locations throughout the compressor section 24. The location of the tap 66 is tailored to provide a bleed airflow 68 of a desired pressure that is compatible with reinjection into the desired location of the turbine section 28.

The bleed airflow 68 is communicated to an exhaust heat exchanger 70. The exhaust heat exchanger communicates thermal energy from the exhaust gas flow 64 to the bleed airflow 68 to generate a heated bleed airflow 72. In one example embodiment, the injection location 75 is within the LPT 46. However, other locations within the turbine section 28 could be utilized and are within the contemplation and scope of this disclosure. A bleed control valve may also be located downstream of tap 66 to control the flow rate or pressure of the bleed air.

Figure 3:
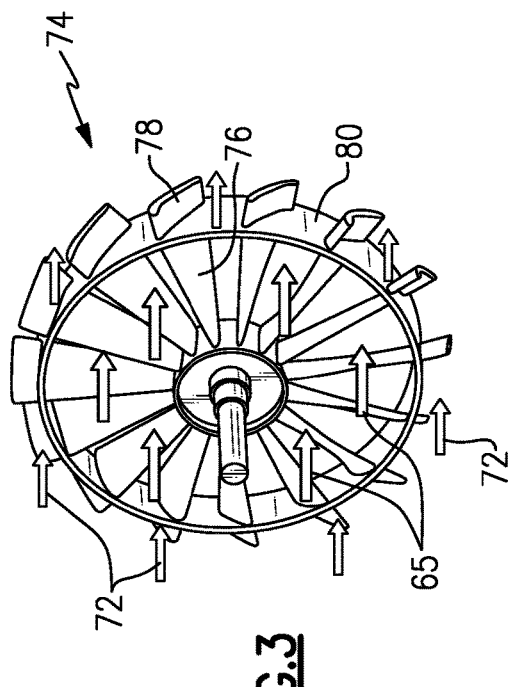
FIG. 3 is a schematic view of example tip turbine rotor embodiment.

Referring to FIG. 3, with continued reference to FIG. 2, in one example embodiment, the LPT 46 includes the tip turbine rotor 74. The tip turbine rotor 74 includes a plurality of inner rotor blades 76 and a plurality of outer rotor blades 78 separated by a shroud 80. The inner rotor blades 76 are disposed within an inner periphery of the shroud 80 and are exposed to the combusted gas flow 65. The outer rotor blades 78 are disposed about an outer periphery of the shroud 80 and exposed to the heated bleed airflow 72.

The heated bleed airflow 72 may be of different pressure and temperature than the combusted gas flow 65. Accordingly, in this disclosed example embodiment, the bleed airflow 72 is isolated from the combusted gas flow 65 by the shroud 80. The different pressure and temperature of the heated bleed airflow 72 from the combusted gas flow 65 are accommodated by the inner and outer turbine blades 76, 78. Isolation of the heated bleed airflow 72 from the combusted gas flow 65 preserves the temperature of the combusted gas flow 65 and the power derived therefrom. Each of the inner turbine blades 76 and outer turbine blades 78 may be optimized to maximize power derived from each of the heated bleed airflow 72 and the combusted gas flow 65. Differing characteristics of each flow can be accommodated to maximize power produced. In one disclosed example, the inner turbine blades 76 are different than the outer turbine blades 78. The differences in the turbine blades 76, 78 may include a different airfoil geometry, different number of blades, and different radial lengths. Other known parameters and configurations of the inner and outer turbine blades 76, 78 may be utilized and optimized and are within the scope and contemplation of this disclosure.

The tip turbine rotor 74 is disposed as one rotor of the LPT 46. The LPT 46 may include multiple rotor and stator stages with a tip turbine rotor or rotors 74 comprising one or more of those stages. In one disclosed example, the LPT 46 includes a plurality of turbine rotors and the tip turbine rotor 74 is the aft most of the turbine rotors. In another disclosed example, the LPT 46 includes a plurality of turbine rotors forward of the injection location 75 and at least one turbine rotor aft of the injection location 75, with the at least one turbine rotor aft of the injection location being a tip turbine rotor 74.

The location of the tip turbine rotor 74 within the LPT 46 corresponds with a particular pressure and temperature encountered within the LPT 46. As the combustion gas flow 65 expands through the LPT 46, the pressure and temperature will decrease. The injection location 75 is provided at a location with the LPT 46 where the pressure and temperature of the expanded combustion gas flow 65 is compatible with the heated bleed airflow 72. Compatibility of the flows is determined by engineering analysis and does not necessarily dictate that each of these flows exhibit the same pressure and temperature. Accordingly, the location of the injection location 75 and the number of tip turbine rotors 74 are provided to maximize supplemental power generation provided by the heated bleed airflow 72.

Figure 4:
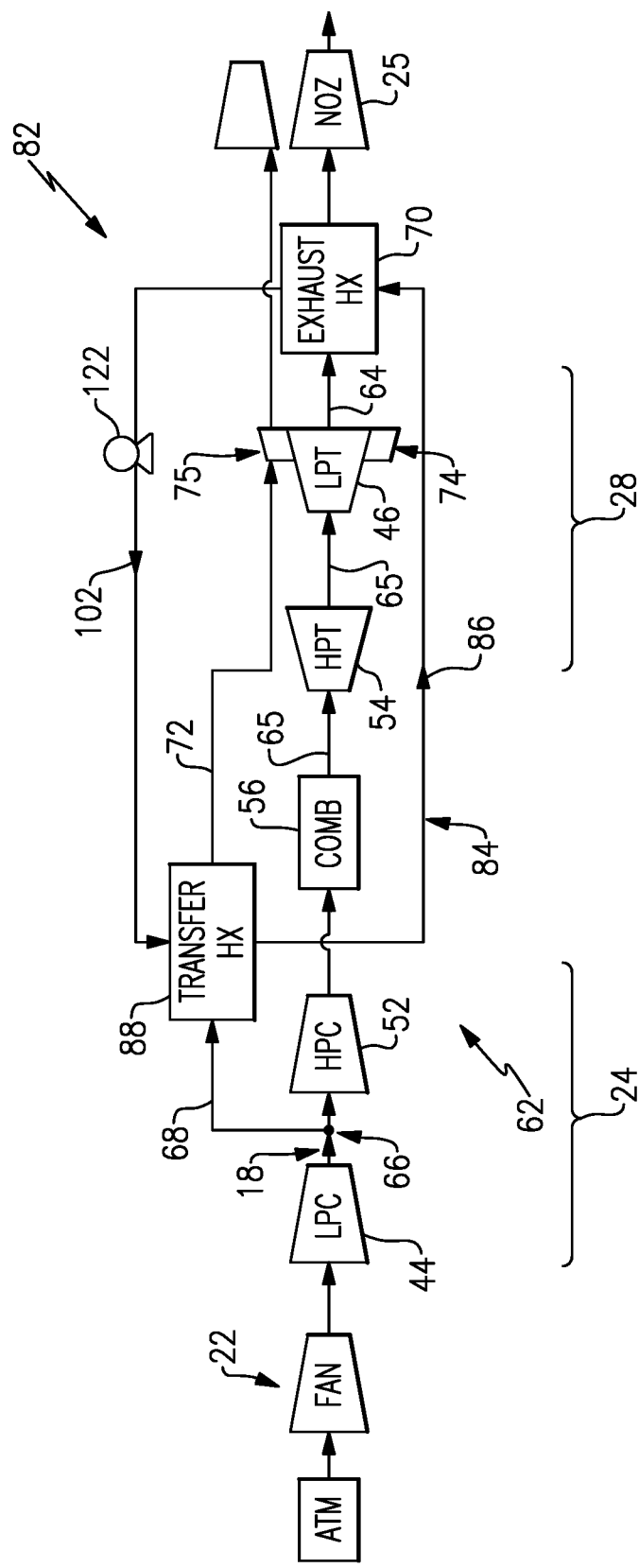
FIG. 4 is a schematic view of another example turbine engine embodiment.

Referring to FIG. 4, another example gas turbine engine embodiment is schematically shown and generally indicated at 82. The engine 82 includes a secondary heat transfer loop 84. The secondary heat transfer loop 84 is a closed loop with a pump 122 that circulates a heat transfer medium 86. The heated heat transfer medium flow 102 is communicated to the transfer heat exchanger 88. The heated transfer medium 102 is heated by the exhaust gas flow 64 in the exhaust gas heat exchanger 70 and transfers the accepted heat into the bleed airflow 68 within a transfer heat exchanger 88. The cooled heat transfer medium flow 86 is then communicated back to the exhaust heat exchanger 70 for reheating.

The heated bleed airflow 72 is injected into the LPT 46 at the injection location 75. The heated bleed airflow 72 expands through the LPT 46 to supplement power derived from the combusted gas flow 65. In this disclosed example, the LPT 46 includes at least one tip turbine rotor 74 as previously described.

The heat transfer loop 84 provides additional options for transfer of thermal energy and enables the additional input of heat from other engine systems. Moreover, the heat transfer loop simplifies communication of the heated bleed airflow 72 to the turbine section 28. The transfer heat exchanger 88 transfers thermal energy into the bleed airflow 68 such that the bleed airflow 68 does not need to be routed aft of the turbine section 28 followed by routing forward again to the injection location.

Figure 5:
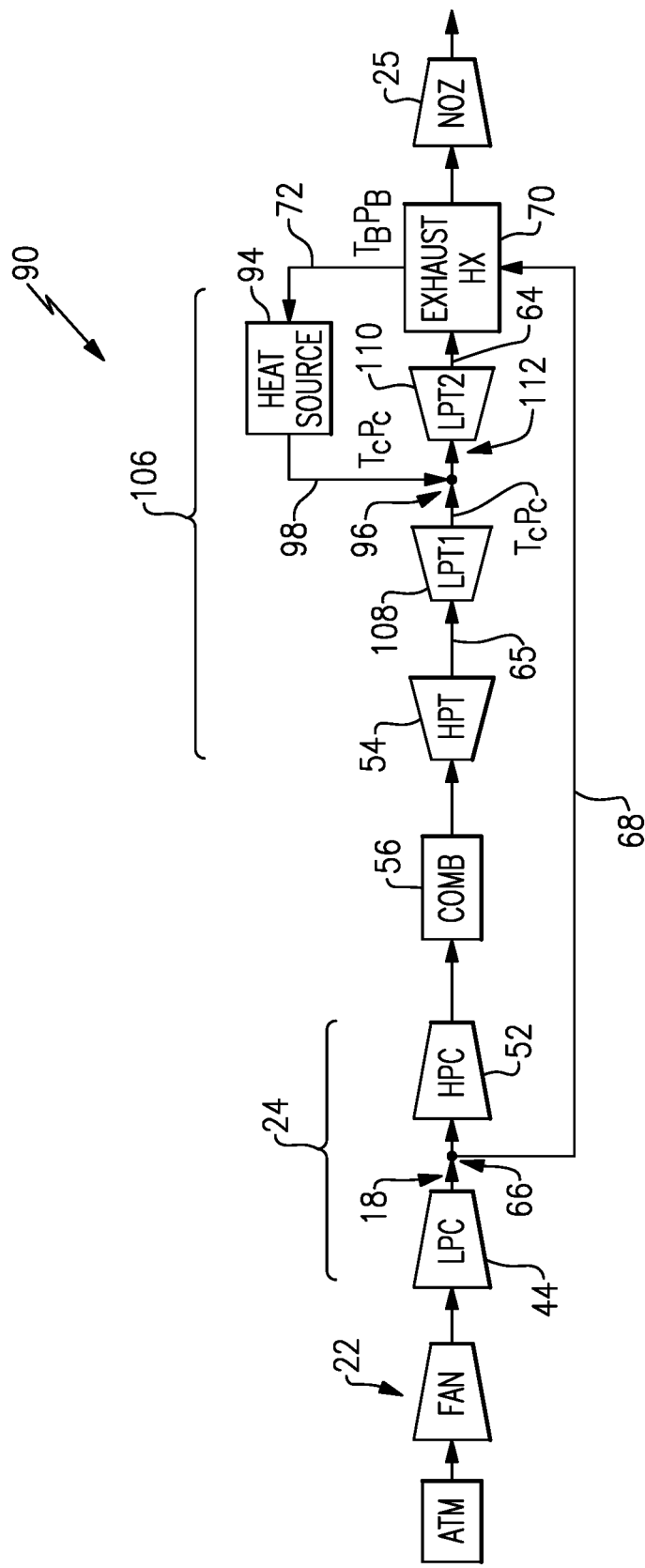
FIG. 5 is a schematic view of another example turbine engine embodiment.

Referring to FIG. 5, another example engine is schematically shown and indicated at 90 and includes a heat source 94 for increasing the temperature of the heated bleed airflow 72 to match the temperature of the combusted gas flow 65 at an injection location 96. In one example embodiment, the heat source 94 is a combustor where fuel is mixed with an airflow and ignited to generate heat that is used to further heat the bleed airflow 72. The heat source 94 may also be a heat exchanger that communicates thermal energy from other engine systems into the bleed airflow 68.

In one example embodiment, the turbine section 106 includes a first low pressure turbine section 108 and a second low pressure turbine section 110 with an injection location 96 for a heated bleed airflow 98 provided therebetween. Bleed airflow 68 is first heated in the exhaust heat exchanger 70. The heated bleed airflow 72 from the exhaust heat exchanger 70 is exhausted at a heated Temperature (Th) and a heated pressure (Ph). The heated bleed airflow 72 is then communicated to the heat source 94 for further heating.

The combusted gas flow 65 expands through the HPT 54 and the first low pressure turbine 108. Due to expansion and cooling of the combusted gas flow 65 through the previous turbine sections, the combusted gas flow 65 is at a combusted temperature (Tc) and combusted pressure (Pc) at the injection location 96. The bleed airflow 72 is heated by the heat source 94 to the combusted temperature (Tc), and reduced in pressure from Ph to Pc prior to being injected into the flow at the injection location 96. Because the bleed airflow 98 is now conditioned to approximately the same temperature (e.g., within 5 degrees, 10 degrees, etc.) and pressure (e.g., within 3 psi, 7 psi, etc.) as that of the combusted gas flow 65 at the injection location 96, the two flows can be mixed with minimal exergy loss. The mixed flow 112 of the heated bleed airflow 98 and the combusted gas flow 65 is than expanded through the second low pressure turbine 110. The mixed flow 112 provides an increased mass flow containing recovered waste heat captured from exhaust heat exchanger 70 that increases the power generated by the second low pressure turbine 110 compared to the power generated without the additional bleed airflow 98.

The injection location 96 is determined based on the thermal energy that will be input into the bleed air flow 68 by the combination of the exhaust heat exchanger 70 and the heat source 94. The waste heat recovered from exhaust heat exchanger 70 directly improves engine efficiency because a portion of this heat is converted to power in second low pressure turbine section 110. The heat addition from heat source 94 raises temperature of the bleed flow in order to introduce the flow into turbine section 110 without penalizing main exhaust flow 65.

Figure 6:
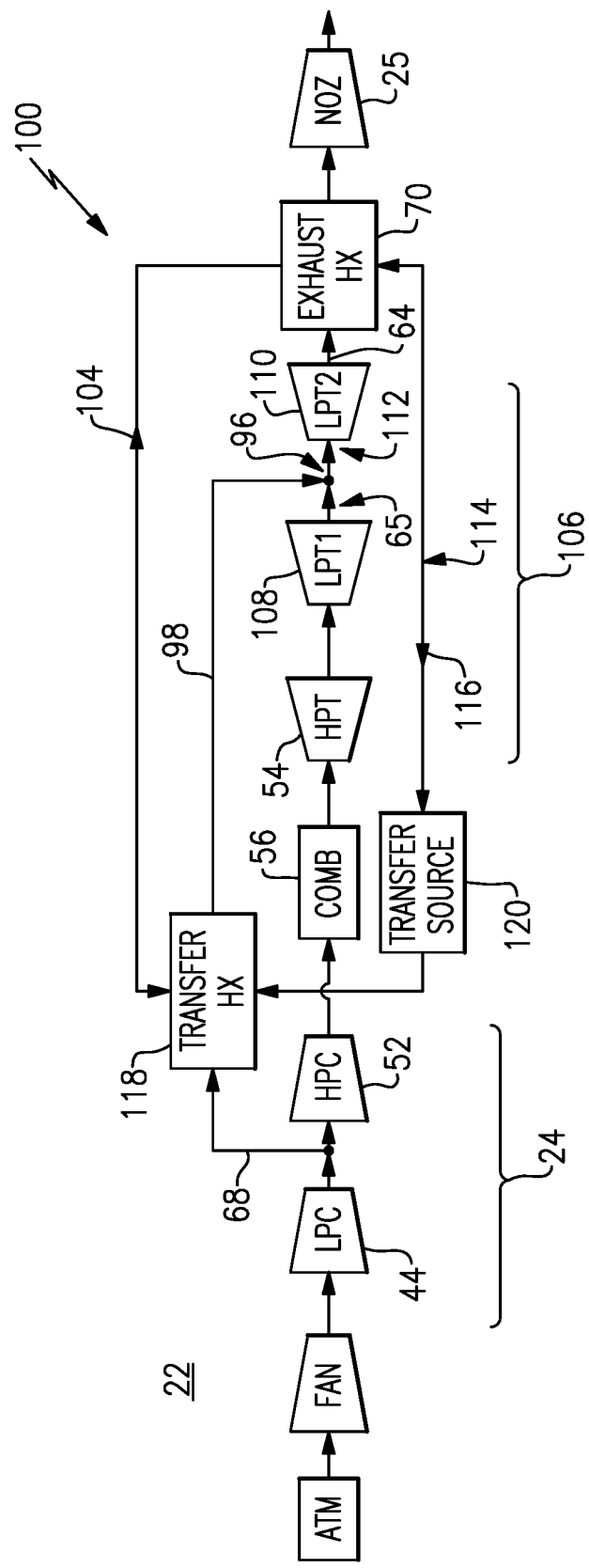
FIG. 6 is a schematic view of another example turbine engine embodiment.

Referring to FIG. 6, another example engine embodiment is schematically shown and indicated at 100 and includes a secondary heat transfer loop 114 for transferring thermal energy from the exhaust gas flow 64 to the bleed airflow 68.

The engine 100 includes a turbine section 106 as described above in view of FIG. 5 with the addition of the secondary heat transfer loop 114 to heat the bleed airflow. Thermal energy is transferred to a heat transfer medium 116 of the heat transfer loop 114 in the exhaust heat exchanger 70. The heat transfer medium 116 then accumulates additional heat from a heat source 120. The heat source 120 may be a secondary combustor or a heat source such as 94 described in FIG. 5.

The heat transfer medium 116 is then placed in thermal communication with the bleed airflow 68 within a transfer heat exchanger 118. The cooler heat transfer medium 104 is then communicated back to the exhaust heat exchanger 70 for reheating.

The bleed airflow 68 is heated to a temperature and slightly reduced in pressure such that it is at approximately the same state as the combustion gas flow 65 at the injection location 96. In this disclosed example embodiment, the injection location 75 is disposed between a first low pressure turbine 108 and a second low pressure turbine 110. The initially tapped bleed airflow 68 is heated to provide a heated bleed airflow 98 that is injected at the injection location and mixed with the combusted gas flow 65 to form a mixed airflow 112. The mixed airflow 112 is expanded through the second low pressure turbine 110 to provide an increased power output.

The addition of the secondary heat transfer loop 114 provides for increased flexibility in utilizing available space, significantly reduces the size of the exhaust heat exchanger 70, and further reduces the complexity and amount of ducting needed to heat and communicate the bleed airflow to the turbine section 106.

The disclosed example waste heat recovery systems provide for the accumulation, transfer and recovery of thermal energy from the exhaust gas flow and other engine and auxiliary systems to supplement engine power output. Moreover, the disclosed systems provide for the advantageous reclamation of heat energy for production of power, improving overall engine thermal efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A waste heat recovery system for a gas turbine engine, the waste heat recovery system comprising:
   a first tap drawing bleed airflow from a core flow path up stream of a combustor section of the gas turbine engine, wherein the combustor section is configured to generate an exhaust gas flow that is expanded through a turbine section;
an exhaust heat exchanger disposed aft of the entire turbine section and configured to transfer thermal energy from an exhaust gas flow of the gas turbine engine into the bleed airflow to generate a heated bleed airflow, wherein the turbine section includes a high pressure turbine section and a low pressure turbine section and the injection location is within the low pressure turbine section; and
an injection location within a turbine section of the gas turbine engine where at least a portion of the heated bleed airflow is received and expanded through the turbine section to generate a mechanical power output;
a secondary heat source configured to heat the bleed air exhausted from the exhaust heat exchanger before injection at the injection location, wherein the heated bleed airflow exhausted from the secondary heat source and the exhaust gas flow exhausted from the low pressure turbine arc of equal pressure and equal temperature.

2. The waste heat recovery system as recited in claim 1, wherein the turbine section includes a high pressure turbine section and a low pressure turbine section and the injection location is within the low pressure turbine section.

3. The waste heat recovery system as recited in claim 2, wherein the low pressure turbine section includes a first low pressure turbine and a second low pressure turbine and the injection location is disposed aft of the first low pressure turbine.

4. The waste heat recovery system as recited in claim 1, further comprising a secondary heat source configured to heat the bleed air exhausted from the exhaust heat exchanger before injection at the injection location.

5. The waste heat recovery system as recited in claim 1, further comprising a secondary heat transfer loop with a heat transfer medium accepting thermal energy from the exhaust gas flow and communicating the accepted thermal energy into the bleed airflow prior to the bleed airflow being communicated to the injection location.

6. A gas turbine engine assembly comprising:
a core engine including a core flow path where a core airflow is compressed in a compressor section, communicated to a combustor section, mixed with fuel and ignited to generate an exhaust gas flow that is expanded through a turbine section, wherein the turbine section is coupled to drive the compressor section through an engine drive shaft, the turbine section including a high pressure turbine, a first low pressure turbine and a second low pressure turbine and the injection location is disposed aft of the first low pressure turbine;
a tap at a location up stream of the combustor section for drawing a bleed airflow;
an exhaust heat exchanger configured to transfer thermal energy from the exhaust gas flow into the bleed airflow; and
an injection location in communication with a portion of the turbine section for communicating a heated bleed airflow exhausted from the exhaust heat exchanger into the turbine section, wherein the heated bleed airflow is expanded to drive the turbine section;
a secondary heat source configured to heat the bleed air exhausted from the exhaust heat exchanger before injection at the injection location, wherein the bleed airflow exhausted from the secondary heat source and the exhaust gas flow exhausted from the first low pressure turbine are of equal pressure and equal temperature.

7. The gas turbine engine assembly as recited in claim 6, wherein the secondary heat source is a low-temperature burner.

8. The gas turbine engine assembly as recited in claim 6, further comprising a secondary heat transfer loop with a heat transfer medium accepting thermal energy from the exhaust gas flow and communicating the accepted thermal energy into the bleed airflow prior to the bleed airflow being communicated to the injection location.

9. The gas turbine engine assembly as recited in claim 6, wherein the compressor section includes a low-pressure compressor disposed upstream of the combustor section and the tap is located downstream of the low-pressure compressor and upstream of the combustor section.

10. The gas turbine engine assembly as recited in claim 6, wherein the heat exchanger is disposed aft of the second lower pressure turbine.

11. A method of operating a gas turbine engine assembly comprising:
generating an exhaust gas flow by igniting a fuel mixed with a core airflow;
communicating a portion of the core airflow as a bleed airflow through a tap located upstream of a combustor section;
heating the bleed air flow in an exhaust heat exchanger disposed aft of a turbine section of the gas turbine engine and in thermal communication with a combusted gas flow exhausted from the turbine section;
heating the heated bleed airflow in a secondary heat source such that the heated bleed airflow and the combusted gas flow exhausted from the turbine section are of equal pressure and equal temperature;
injecting the heated bleed airflow from the secondary heat source through an injection location within the turbine section; and
generating shaft power by expanding the exhaust gas flow and at least a portion of the heated bleed airflow through the turbine section.

12. The method as recited in claim 11, wherein the turbine section includes at least one turbine rotor with inner rotor blades through which the exhaust gas flow expands and outer rotor blades through which the heated bleed airflow is expands.

13. The method as recited in claim 11, further comprising heating bleed airflow exhausted from the exhaust heat exchanger with a secondary heat source before injection at the injection location.

\* \* \* \* \*

UNITED STATES PATENT AND TRADEMARK OFFICE
CERTIFICATE OF CORRECTION

| | |
|---|---|
| PATENT NO. | : 12,078,102 B2 |
| APPLICATION NO. | : 17/951972 |
| DATED | : September 3, 2024 |
| INVENTOR(S) | : Taylor et al. |

It is certified that error appears in the above-identified patent and that said Letters Patent is hereby corrected as shown below:

In the Claims

Claim 1, Column 9, Line 21, "arc" should read --are--.

Signed and Sealed this
Eighth Day of October, 2024

*Katherine Kelly Vidal*

Katherine Kelly Vidal
*Director of the United States Patent and Trademark Office*